Feb. 20, 1962     A. SOMMER     3,021,566
METHOD FOR THE PRODUCTION OF BITUMINOUS COMPOSITIONS
Filed June 13, 1956
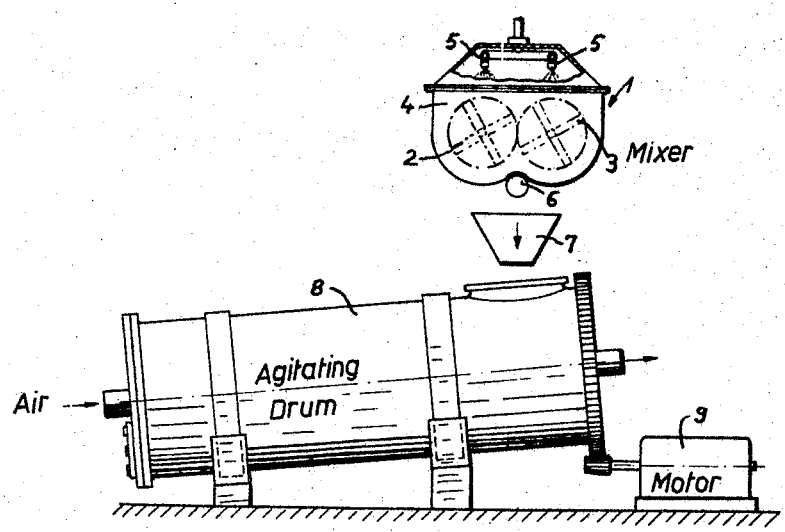
Inventor
Albert Sommer
By
Wenderoth, Lind & Ponack
Attorneys

United States Patent Office 3,021,566
Patented Feb. 20, 1962

3,021,566
METHOD FOR THE PRODUCTION OF BITUMINOUS COMPOSITIONS
Albert Sommer, Montagnola, Tessin, Switzerland, assignor to "Straba" Handels-Aktiengesellschaft, Zurich, Switzerland
Filed June 13, 1956, Ser. No. 591,017
Claims priority, application Switzerland June 14, 1955
4 Claims. (Cl. 18—47.5)

This invention relates to a method for the production of bituminous compositions and more particularly to a method concerning the preparation of compositions containing hard bitumen.

In the conventional use of bitumen of hard consistency, for example blown asphalt, for producing bituminous compositions which are to be molded into shaped bodies such as for example flooring block, it is difficult to obtain a uniform thin coating of the aggregate particles and a correct proportion of asphalt without heating the components of the mix to exceedingly high temperatures, involving the danger of decomposition of the bitumen. The operation and manipulation of high melting point bitumen are difficult and require special equipment. It is known that asphalt can be hardened by vacuum distillation or by oxygen chiefly blowing air into the bitumen, also by the action of certain peroxides. A similar action is obtained by sulphur. Such asphalts thus treated are of a rubber-like consistency and highly viscous when fluid, so that the mixing of such hardened asphalt with mineral aggregate is difficult.

It is an object of the invention to provide a method in which, instead of hardening the bitumen prior to its addition to the mineral components, the bitumen is subjected to the hardening process only after its mixture with the mineral aggregate. First there is produced a mixture of bitumen of low melting point with aggregate of the desired granular sizes, for example sand and filler, in loose flowable condition, and afterwards the mixture is subjected to the hardening process. This method offers the advantage that a mixture is obtained having a precisely controllable proportion of bitumen without requiring complicated equipment, while hardening of the binding agent can be effected at any desired moment without any difficulties. This hardening can be easily obtained in that the finely divided bitumen in the mineral aggregate exposes a great free surface to the hardening agent (oxygen or hot air, sulphur, etc.).

My improved method also is advantageous in that the conventional methods of mixing hard bitumen with fine aggregate (filler) require the latter to be brought to high temperatures involving considerable expense and operational difficulties. According the new improved method preheating of the mineral powder is not necessary, the mixing operation is considerably simplified.

Example 1

A loose bituminated filler is produced in inactive or active condition, i.e. in which either the bituminous particles are coated with aggregate powder (when the mix is prepared below the liquefying temperatures of the bitumen) or in which the aggregate particles are coated with bitumen and the mixture becomes adhesive (when the mixture is prepared at or exposed to a temperature above the flowing point of the bitumen). This filler may have a bitumen content of from 8 to 12% and the bitumen used in the mix may have a penetration of for example 100. For producing this composition an equipment may be used which is described for example in my prior U.S. Patents Nos. 2,726,852 and 2,445,928 in which the mineral aggregate comprising granulous or pulverulent solid materials is whirled up by means of impeller units in a closed container and is sprayed with atomized plastic binding material in liquid form while suspended in air.

The drawing shows a schematic view of a preferred apparatus for carrying out the invention.

Referring to the annexed drawing, the mixer 1, as already shown in my earliest Patent No. 2,572,068, comprises two impeller units 2 and 3 rotatable in opposite directions in a closed container 4 for the granulous and/or pulverulent aggregate which is coated by a low melting point bitumen atomized through nozzles 5 in the upper portion of the container, onto the floating particles of the aggregate which is continuously whirled up by the impeller units.

The bituminated filler obtained in this manner and which is uniformly impregnated with bitumen is discharged at any desired moment through outlet 6 and hopper 7 into an agitating drum or like device 8 which may be provided with internal or external heating means and is rotated by means of a motor 9. In this drum, the bituminated filler is subjected to a stream of air until the bitumen content has obtained the desired degree of hardening, for example until the point of fusion of the bitumen is about 250° C. The mixture containing the hardened bitumen is then discharged and may be either mixed with other i.e. coarser aggregates and/or compressed into the desired forms by the usual mechanical means.

Example 2

The mineral aggregate of suitable granular size is mixed dry before the addition of bitumen with peroxides, for example manganese peroxide, in the required proportion relative to the bitumen content of the mix, and then the aggregate is impregnated with a low melting bitumen by means of the mixing device referred to in Example 1. The impregnation is carried out for the time only which is required to atomize the necessary amount of bitumen, for example about 30 seconds.

The produced loose bituminous mixture is then heated in a heating drum or the like and subjected therein to the action of the oxygen on the bitumen as described in Example 1, or the mixture is first moulded into shaped bodies and these are then subjected to heat in any convenient manner.

Example 3

The mineral aggregate, consisting for example of sand and/or filler, is mixed with powdered sulphur in a quantity proportional to the bitumen, whereupon liquefied low melting point bitumen is dispersed in the aggregate by spraying as described in Example 1. The obtained loose mixture can then be heated in a slowly rotating heatable agitating drum in order to release the hardening effect of the sulphur upon the bitumen or the mixture may be moulded first into desired shapes which can subsequently be subjected to the hardening action as in Example 2.

I claim:

1. In a method of preparing a bituminous composition containing a high melting point bitumen and a mineral aggregate, the steps comprising coating the particles of granulous and pulverulent aggregate material with bitumen by atomization of a liquefied low melting point bitumen onto said particles while they are suspended in air, and then subjecting the mass of bitumen coated particles to the action of hot air while simultaneously agitating said mass, for hardening the bitumen component thereof.

2. In a method of preparing a bituminous composition containing a high melting point bitumen and a mineral aggregate, the steps comprising coating the particles of granulous and pulverulent aggregate material with bitumen by atomization of a liquefied low melting point bitumen onto said particles while they are suspended in air, and then subjecting the mass of bitumen coated particles to the action of oxygen and heat while simultaneously agitating said mass, for hardening the bitumen component thereof.

3. In a method of preparing a bituminous composition containing a high melting point bitumen and a mineral aggregate the steps comprising adding peroxides to particles of granulous and pulverulent aggregate material, coating said particles with bitumen by atomization of a liquefied low melting point bitumen while they are suspended in air and then heating the mass of bitumen coated particles for hardening the bitumen content by the oxygen released from said peroxides.

4. In a method of preparing a bituminous composition containing a high melting point bitumen and a mineral aggregate, the steps comprising adding peroxides to the particles of granulous and pulverulent aggregate material, then whirling up in a mixing container said peroxides and particles and spraying with bitumen by atomization of a liquefied low melting point bitumen while suspended in air, then molding said material into shaped articles and then heating said articles for hardening the bitumen component thereof.

References Cited in the file of this patent

UNITED STATES PATENTS

| | | |
|---|---|---|
| 2,445,928 | Sommer | July 27, 1948 |
| 2,484,792 | Mollring | Oct. 11, 1949 |
| 2,562,149 | Mollring | July 24, 1951 |
| 2,726,852 | Sommer | Dec. 13, 1955 |